June 4, 1935.  C. B. STRANDGREN  2,003,317
POWER TRANSMISSION
Filed Oct. 25, 1933  4 Sheets-Sheet 1
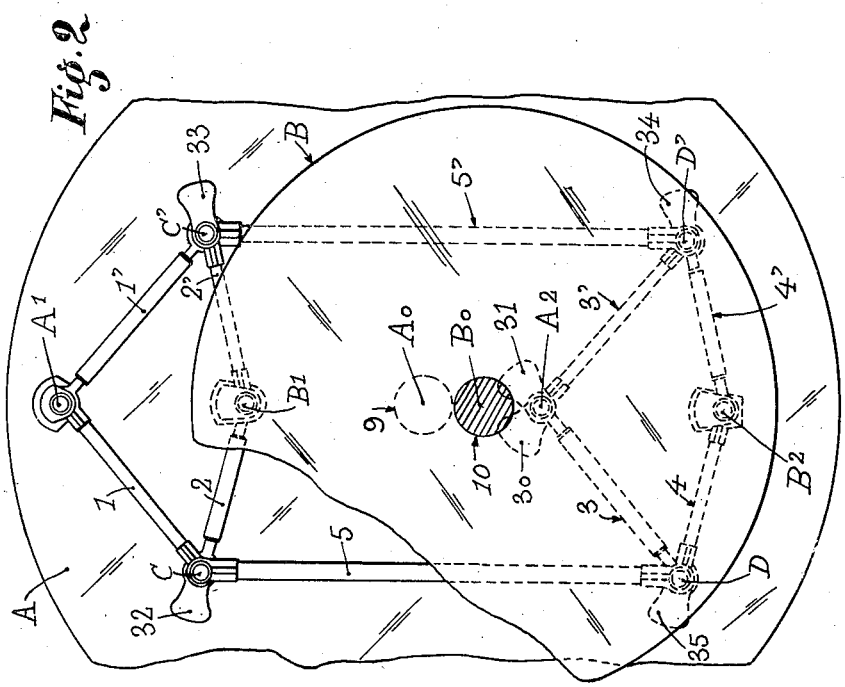
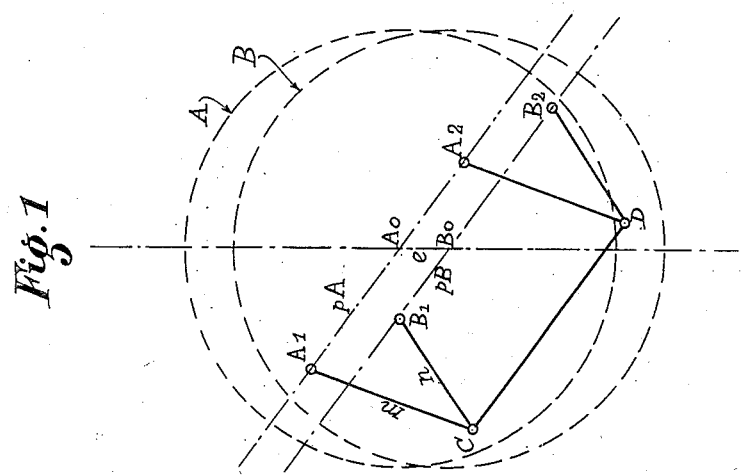
C. B. Strandgren
INVENTOR
By Marks & Clerk
Attys.

June 4, 1935.  C. B. STRANDGREN  2,003,317
POWER TRANSMISSION
Filed Oct. 25, 1933   4 Sheets-Sheet 2
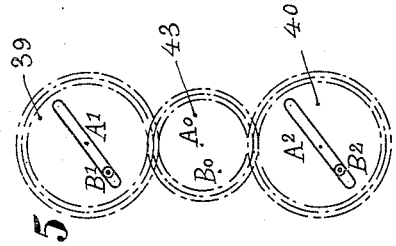
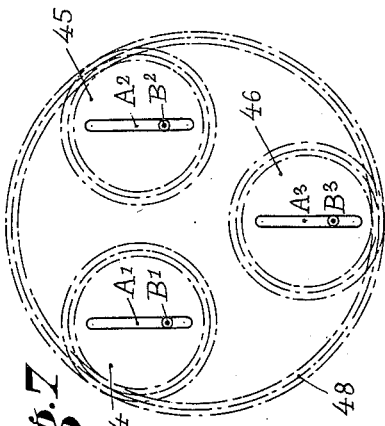
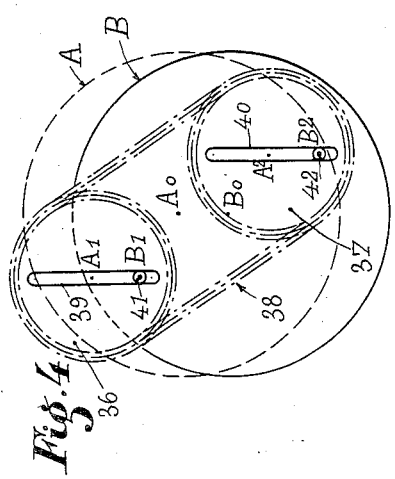
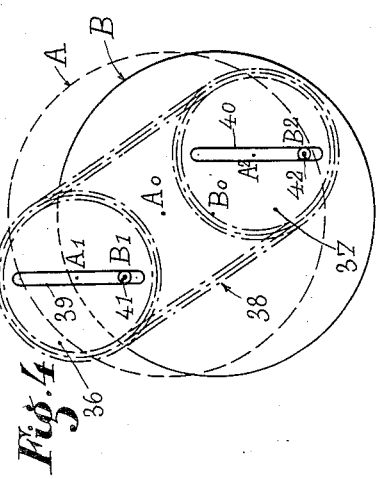
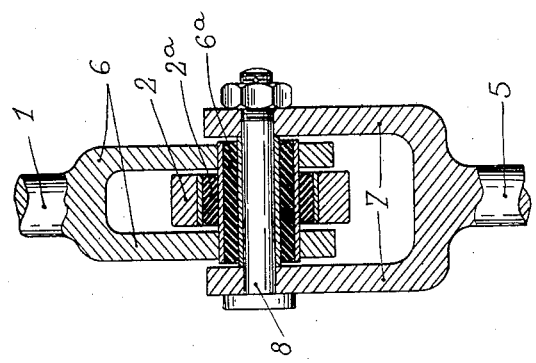
C. B. Strandgren
INVENTOR
By Marks & Clerk
ATTYS.

June 4, 1935.    C. B. STRANDGREN    2,003,317
POWER TRANSMISSION
Filed Oct. 25, 1933    4 Sheets—Sheet 3
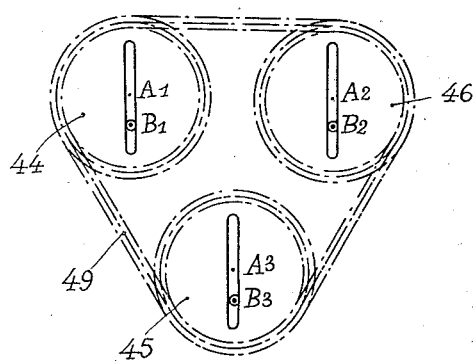
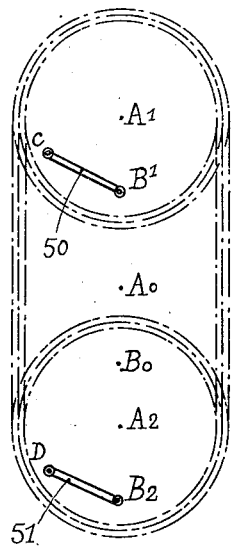
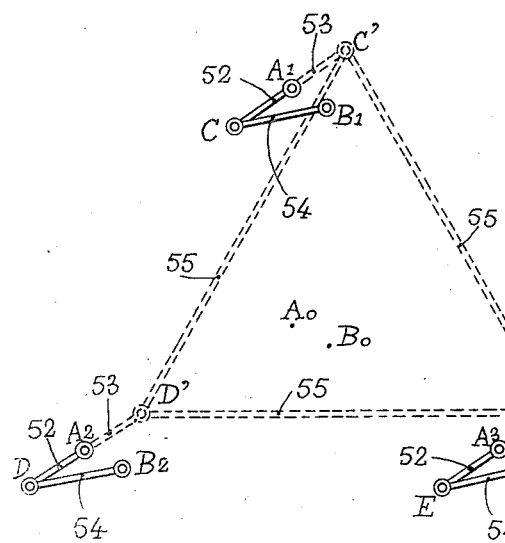
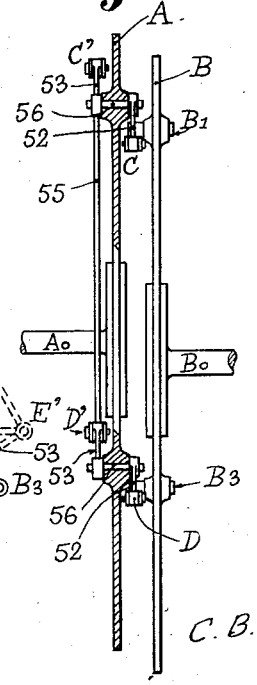
C. B. Strandgren
INVENTOR
By Marks & Clerk
Attys.

June 4, 1935.  C. B. STRANDGREN  2,003,317
POWER TRANSMISSION
Filed Oct. 25, 1933   4 Sheets-Sheet 4
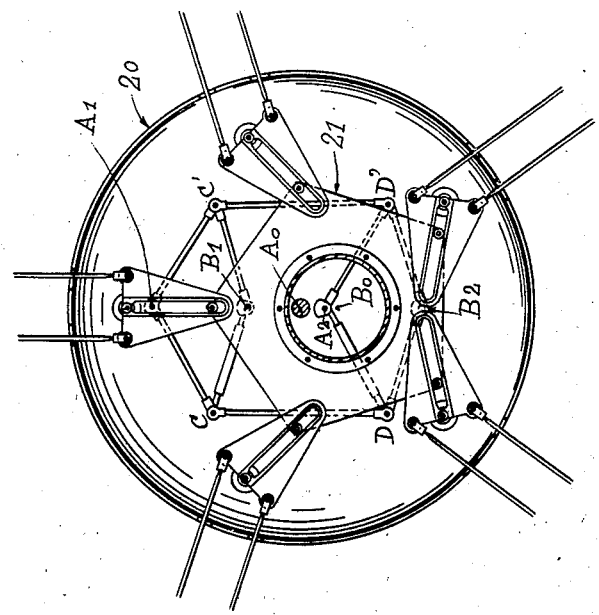
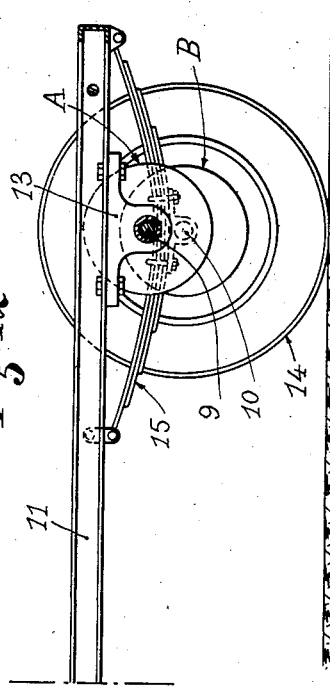
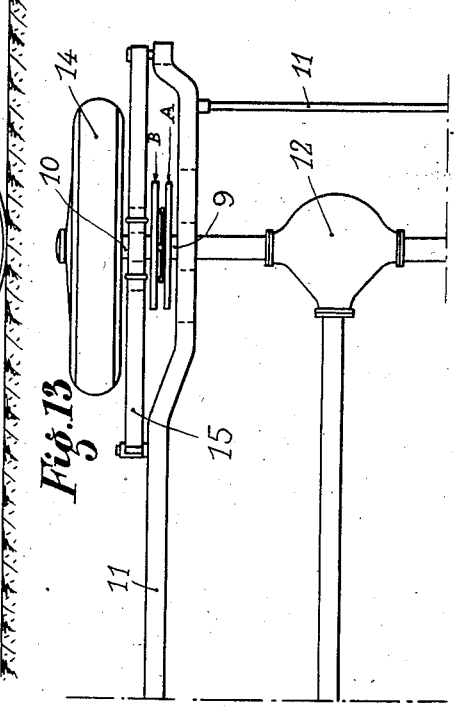
C. B. Strandgren
INVENTOR
By Marks & Clerk
Attys.

Patented June 4, 1935

2,003,317

UNITED STATES PATENT OFFICE 2,003,317

POWER TRANSMISSION

Carl Bruno Strandgren, Versailles, France

Application October 25, 1933, Serial No. 695,188
In France November 26, 1932

5 Claims. (Cl. 74—68)

The present invention relates to a power transmission device of the homo-kinetic type, adapted for making connection between two parallel or practically parallel shafts, and more particularly between two parallel shafts whose spacing is variable during their rotation. The said device which is in fact intended to replace the joint having two perpendicular slots, termed "Oldham joint", may be utilized especially in order to connect a vehicle wheel, mounted on springs, with its driving device (driving shaft of a motor vehicle, electric motor of an electric locomotive or the like).

The preferred use considered by the applicant consists in the connection between the shaft of a feathering paddle wheel, such as the one described in my French Patent No. 700,476 of November 20th, 1929, and the rotary device of variable eccentricity which controls the oscillation of the oscillating blades or paddles.

The device according to the invention consists of at least two rotary members which are mounted loose on the driving (or the driven) member, of a coupling connection (by links, gearing, chain or the like) between the said rotary members, in order that the rotation of one member will effect a rotation, having the same amplitude and direction, of the other rotary member and of at least two equipollent connections (by links, slots or the like) between two points of the driven (or the driving) member and the said rotary members, respectively.

The term "equipollent connections" is understood to signify connections of such nature that the straight lines connecting the corresponding points of the driving (or the driven) member with the rotary members will be constantly parallel, and will have the same length and the same direction with reference to a straight line passing through the specified points of the driven (or the driving) member.

The most diagrammatic embodiment of this arrangement is the one in which the rotary members consist of links, the coupling connection consists of a link forming with the aforesaid links a jointed parallelogram, and the equipollent connections consist of two other links, forming with the coupling link a second jointed parallelogram.

In the accompanying drawings, which show various embodiments and applications of the invention:

Fig. 1 is a diagrammatic view of an apparatus having five links.

Fig. 2 is an elevational view showing a practical construction of the apparatus with its balancing device.

Fig. 3 is a detail view of a joint.

Figs. 4 to 10 are diagrammatic views showing several modifications of the invention.

Fig. 11 is a side view of Fig. 10, with parts broken away.

Fig. 12 is a diagrammatic elevational view showing the application of the invention to the driving of a wheel of a motor vehicle having a spring mounting.

Fig. 13 is a corresponding plan view.

Fig. 14 shows the application of the invention to the driving of the blades or vanes of a wheel with oscillating blades or vanes.

The arrangement shown in Fig. 1, which is adapted to connect a member A (for example a driving disc rotating in axis $A_0$) with a member B (for example a driven disc rotating on axis $B_0$), comprises five or more links, which are situated in the following manner:

A first group of two links of equal length $A_1C$, $A_2D$, pivoted to device A at $A_1$ and at $A_2$, and constituting the two rotary members above mentioned, A second group of two links of equal length $B_1C$, $B_2D$, pivoted to device B at $B_1$ and at $B_2$, the distance $B_1B_2$ being equal to the distance $A_1A_2$; these links constitute the equipollent connections above indicated, A coupling link CD having the same length as $A_1A_2$, and pivoted at its ends to the ends of the aforesaid links.

In the example represented, axes $A_0$ and $B_0$ of rotation of members A and B are located on the straight lines $A_1A_2$ and $B_1B_2$ respectively.

For any angular position given to the device, the side CD of the parallelogram $A_1A_2CD$ is parallel to $A_1A_2$, and the side $B_1B_2$ of the parallelogram $B_1B_2$ CD is parallel to CD and consequently to $A_1A_2$. The angular position of member B is thus determined by a direction ($A_1A_2$) and a point $B_0$, and in this manner there will be only a single angular position possible for member B for a given position of member A. Hence the power transmission will be positive.

On the other hand, if $A_1A_2$ rotates about $A_0$ through an angle $\alpha$, $B_1B_2$ will rotate about $B_0$ through an equal angle. The angular speed $$\frac{d\alpha}{dt}=\omega$$

of the two members is thus the same at each instant. The power transmission is therefore homo-kinetic.

Furthermore, in order that for each position of member A, there will exist a corresponding position of member B, that is to say, in order that the whole aggregate may rotate by a complete revolution, it can be readily demonstrated that the dimensions of the members should comply with the following conditions:

(1) $(m+n) > (d+e)$
(2) $(m-n) < (d-e)$ $m$ and $n$ being the lengths of the two groups of links, $e$ the eccentricity $A_0B_0$, and $d$ the absolute value of the difference between the distances $pA$, $pB$ between the pivoting points $A_1$, $B_1$ and the corresponding centres of rotation $A_0$, $B_0$ ($d = pA - pB$). In these formulæ, we should consider only the absolute value of the quantities $m-n$ and $d-e$. It is found that if $d > e$, $m > e$ and $n > e$; and if $d < e$, $m > d$ and $n > d$.

In the practical construction of the apparatus, it is preferable, in order to avoid the overhang of the axes representing the points C and D, to locate all of the links in the same plane, and to provide straps on the ends of two of the links, which are connected at the points C and D, one of the straps surrounding the second, and the second covering a hole formed in the third link, the pivot axis passing through the said hole and the two straps. However, it is evident that the rotation of the apparatus will not be possible unless the angles $\widehat{A_1CB_1}$, $\widehat{B_1CD}$, and $\widehat{DCA_1}$ shall never be annulled. It can be readily demonstrated that if the relation (2), $(m-n)<(d-e)$ is as desired, the angle $\widehat{B_1CD}$ can never be annulled. In order that the angle $\widehat{A_1CB_1}$ shall not be annulled, it is necessary that the circle described by the point $B_1$ shall remain constantly in the interior of the circle described by the point $A_1$, which condition is realized when we obtain:

(3) $d > e$ whence we deduct, from the relations (1) and (2), (4) $m > e$ and (5) $n > e$ In reality, owing to the thickness of the straps, it is necessary that the minimum angles made by the links among themselves shall exceed a given value, differing from zero, in such way that we will finally obtain:

(6) $d > (e+k)$
(7) $m > (e+k')$
(8) $n > (e+k')$ $k$ and $k'$ being quantities determined by the dimensions of the straps.

In short, the geometrical conditions of the operating of the apparatus are shown by the relations (1) and (2) above mentioned, but the practical conditions for the construction of an apparatus in which all of the links are in the same plane, are shown by the additional relations (6), (7) and (8) above-mentioned.

In order to construct an apparatus of this kind, the quantities $m$, $n$ and $d$ will be chosen according to the eccentricity $e$ of the axes (if the axes are in a fixed position with reference to one another), or according to the maximum eccentricity $e_m$, if this eccentricity is variable.

Figs. 2 and 3 show an example of a practical construction of the apparatus, in which there are utilized, in order to obtain the equilibrium, two systems of five symmetrical links $1$, $1'$, $2$, $2'$, $3$, $3'$, $4$, $4'$ and $5$, $5'$. At each of the points C, C', D, D', two of the links are terminated by a strap and the end of the third link is pierced with a hole. Thus in Fig. 3, which shows the arrangement at the point C, link $1$ ends in a strap $6$, and link $5$ in a strap $7$, whilst link $2$ has a hole at the end, axis $8$ traversing the whole. It will follow that axis $8$ is not in an overhanging position as all of the links are in the same plane. This permits, on the other hand, to reduce the distance between discs AB to a minimum.

At the points $A_1$, $A_2$, $B_1$, $B_2$, one of the links ends in a strap, and the end of the other is pierced with a hole.

$9$ indicates the shaft which is secured to disc A, and $10$ the shaft secured to disc B.

Obviously, at each of the pivot points, between the axis and the corresponding links, either smooth bearings, or ball or roller bearings, and preferably needle bearings (the rollers consisting of fine needles in great number) which take up a very small space may be used. As the relative movements of the links are movements of oscillation having a limited amplitude, elastic joints of the "silentbloc" type may also be used, such joints dispensing with all lubrication, and allowing the connection of shafts which are not exactly parallel.

At the points C and D, the bearings may be juxtaposed that is arranged side by side or, as represented in Fig. 3, at $2^a$ and $6^a$, they may be superposed that is arranged around one another. Fig. 3 shows an arrangement with the use of "silentblocs".

As represented in Fig. 2, it is possible to improve the static and the dynamic equilibrium of the apparatus by the use of masses $30$, $31$, $32$, $33$, $34$, $35$. Masses $32$, $33$, $34$, $35$ respectively counterbalance the weights of the links $2$, $2'$, $4$, $4'$, whatever be the angular position of the latter. Masses $30$ and $31$ counterbalance the weight of the remainder of the system, whatever be the position of the latter. They also compensate the lack of equilibrium due to the fact that the points $A_1$, $A_2$ of member A are not symmetrical with reference to the centre $A_0$.

In addition to the balancing of the weights of the parts, it is necessary to make up for the loss of equilibrium due to the forces of intertia, which result from the relative displacement of the links with respect to one another. Thus, referring to Fig. 1, it is observed that the angle $B_1CA_1$ constantly varies, and thus link $B_1C$ oscillates with reference to link $A_1C_1$ this producing effects of inertia which should be avoided, for certain applications.

However, in order to prevent angle $\widehat{B_1CA_1}$ from varying, it would be necessary to take measures in order that $B_1A_1$ should be constant. This could be effected if we constantly obtain $A_1B_1 = A_0B_0 = e$, irrespective of the value of $e$, that is to say, if we had $pA = pB$ and $m = n$; but these conditions are incompatible with the practical conidtion above indicated $d > e$, since in this case we would have $d = pA - pB = 0$.

In order to obtain the desired result, it is thus necessary to abandon the idea of locating all the links in the same plane, or to adopt the slot devices which will be mentioned below.

In the apparatus shown in Fig. 4, the links 1, 1', 3, 3' are replaced by rotary members for example by two like sprocket wheels 36, 37 mounted loose upon member A; the connecting links 5, 5' are replaced by an endless chain 38, and the equivalent links 2, 2', 4, 4' are replaced by a system of slots 39, 40 and of rollers 41, 42. The grooves 39, 40 are parallel when the chain is put in place, and thus they will always remain parallel since a rotation of wheel 36 through any angle $\alpha$ causes an equal rotation of wheel 37. Rollers 41, 42 materially represent the points $B_1B_2$.

It is observed that if $A_1B_1$ is equipollent to $A_0B_0$, this condition will be always the same, and the movement of rotary members 36—37 instead of being an oscillating movement as in the case of Fig. 2 will be continuous and uniform, and will give rise to no effort of inertia.

It will be noted that, in this device, when the eccentricity of the shafts is null, the points $A_1B_1$—$A_2B_2$ will coincide. On the other hand, the connection made by the slots does not require that the shafts shall be exactly parallel, owing to the possible slight play of the rollers in the slots.

Fig. 5 shows a modification of the preceding device, in which the coupling connection is not obtained by means of a chain, but by means of an intermediate pinion 43.

The arrangements indicated below afford a greater uniformity of the inertia of the system in rotation, due to a better distribution of the masses about the axes of rotation.

As represented in Figs. 6, 7 and 8, three rotating members may in fact be used instead of two, for instance three gear-wheels 44, 45, 46 connected together by the coupling member, which consists of a central gear-wheel 47 (Fig. 6) or of an outer toothed ring 48 (Fig. 7), or of an endless chain 49 (Fig. 8), or of a set of links connecting the wheels or discs 44, 45, 46 together in pairs, etc. The equipollent connections may, as before, consist of systems of guides, (slots and rollers) of links, or the like.

In this manner, Fig. 9 shows by way of example a device of the type shown in Fig. 4, but in which the equipollent connections are obtained by means of links 50 and 51. The analogy with the apparatus shown in Fig. 1 is thus apparent, and the pivot points C, D of said links correspond to like points in Fig. 1.

It is obvious that the preceding demonstration is applicable to all of these apparatus, which assure a drive of a "positive" and a "homo-kinetic" nature. However, the conditions for the practical construction are more simple, in the case of slots since it will suffice that the length $l$ of the slot shall comply with the condition:

$$l > 2e_m$$

$e_m$ being the maximum eccentricity of the shafts.

The arrangement of links shown in Fig. 1 can also be modified, for the better distribution of the masses about the axis of rotation, as shown in Figs. 10 and 11. In this example, the rotary members consist of three links 52 of equal length, pivoted at the points $A_1A_2A_3$ of member A upon axes 56. These points form the apices of an equilateral triangle whose centre is $A_0$. The links 52 are located on the face of members A which is adjacent member B. On the other face of member A are mounted links 53 of equal length B, secured to axes 56, and all of these links make a determined angle with the corresponding link 52, for instance an angle of 180°, as shown in Fig. 10.

The coupling connection is made by means of three links 55 which are connected with the free ends C', D', E' of links 53.

On the other hand, the equipollent connections are made by three links 54 of equal length which connect the points $B_1B_2B_3$ of member B with the ends C, D, E of links 52.

It will be readily understood that this apparatus operates according to the same principle as the one shown in Fig. 1. However, in order to avoid pivoting four links at the same point (C, D or E), the pivots of the coupling links 55 are located on the other face of member A, by the use of the links 53.

In the case in which the shafts to be connected are not exactly parallel, use may be made of a hinged joint for the links 52 or 54, the axis of the hinge being situated in the plane of the figure and perpendicular to the axis of the corresponding link.

It will be noted that in the apparatus shown in Fig. 10, the eccentricity of the shafts will never be annulled, and this may be advantageous for certain applications. If, on the contrary, it is desired that the eccentricity may be annulled, the links 52 and 54 will be given equal lengths.

It is obviously possible to devise a great number of other devices based upon the same principle, and to increase at will the number of rotary members and equipollent connections, by using a coupling connection which is adapted to simultaneously rotate all of the rotary members through the same angle.

It will be observed that the apparatus above described will advantageously replace the systems of double Cardan, the Oldham, or others, owing to their small size in width, to their high mechanical efficiency and to the reduction of friction to a minimum. It is further to be noted that they provide for the transmission of great power and torque.

They may be employed, for example, for making connection between an electric motor of an electric vehicle, which motor is mounted on the vehicle frame, and a driving wheel mounted on springs. An advantageous application of the same device, consists in the connection between a driving axle of a motor car and a driving wheel mounted on springs. In this case, the driving axle may be arranged on the vehicle frame, and the driving wheels may have an independent spring mounting. On the other hand, the two Cardans connecting the driving shaft with the gear-wheel driving the differential may be eliminated.

Figs. 12 and 13 show such an application in a diagrammatic manner; 11 indicates the vehicle frame which carries the motor. The rear axle 12, for example, is mounted on the frame by means of supports 13. The axle 10 of the driving wheel 14 is secured to a suspension spring 15 and carries a disc B which is connected with the disc A secured to the driving axle 9, by the device according to the invention.

It will be noted that in spite of the variations of the eccentricity of the shafts 9 and 10, due to the bending of the spring 15, the device according to the invention will provide for the proper operation of the driving wheel 14. Stops may be provided to limit the maximum eccentricity $e$, corresponding to the conditions above indicated.

The devices according to the invention may also be interposed in a line of power transmission shafting whose bearings are not well in line or which are likely to get out of line. They may be further employed for operating the rolls of rolling mills, whose axis is displaced while remaining parallel, according to the thickness of the plates to be obtained.

Another interesting application of the said device is for the control of the oscillation of the blades in a feathering paddle wheel of the type described in the French Patent No. 700,746 above mentioned, as shown in Fig. 14, which corresponds to Fig. 2 of said French Patent No. 700,746. In this figure, 20 indicates the rotary disc of the wheel secured to the driving shaft $A_0$; 21 indicates the pentagonal piece controlling the oscillation of the blades and rotatable on an imaginary axis $B_0$ whose eccentricity is variable with reference to the axis $A_0$. By way of example, it is supposed that one makes use of the apparatus shown in Fig. 2, $A_1$, $A_2$, $B_1$, $B_2$, C, D, C', D', being the pivot points of the links connecting the member 21 with the disc 20, the points $A_1A_2$ being located on the disc 20, and the points $B_1B_2$, on the member 21.

Obviously, the invention is not limited to the particular applications above specified.

Having now described my invention what I claim as new and desire to secure by Letters Patent is:

1. In a power transmission device, a driving member and a driven member adapted to rotate about respective axes, at least two rotary discs loosely mounted upon one of said members and each provided with a diametral slot, said slots being parallel, a coupling connection between said discs and at least two rollers loosely mounted upon the other of said members, each roller engaging the slot of one of said discs.

2. A device as claimed in claim 3, wherein said discs consist of toothed wheels and said coupling connection consists of a chain engaging said wheels.

3. In a power transmission device, a driving member and a driven member adapted to rotate about respective axes, at least two rotary discs loosely mounted upon one of said members, a coupling connection between said discs and at least two equipollent connections between at least two points of the other of said members and said discs respectively.

4. A device as claimed in claim 3 wherein said discs consist of toothed wheels and said coupling connection consists of a pinion engaging said wheels.

5. In a power transmission device, a driving axle and a driven wheel, a driving connection between the axle and wheel comprising a driving member secured to the axle, a driven member carried by the wheel, at least two rotary discs loosely mounted on one of said members, a coupling connection between said discs, and at least two equipollent connections between at least two points of the other of said members and said discs respectively.

CARL BRUNO STRANDGREN.